United States Patent [19]

Sandvik et al.

[11] Patent Number: 5,664,402
[45] Date of Patent: Sep. 9, 1997

[54] METHOD AND MEANS FOR HARVESTING AND PACKAGING SEEDS

[75] Inventors: Arlan W. Sandvik; Brian W. Carr, both of Nevada; Peter B. Moore, Ames; Donald F. Handorf, Ames; Kevin J. Alphs, Ames; Mark D. Mathis, Roland, all of Iowa

[73] Assignee: Gary W. Clem, Inc., Nevada, Iowa

[21] Appl. No.: 535,745

[22] Filed: Sep. 28, 1995

[51] Int. Cl.$^6$ .................................................. B65B 43/38
[52] U.S. Cl. .................. 53/384.1; 53/391; 53/385.1; 53/389.2
[58] Field of Search ............................... 53/384.1, 385.1, 53/389.2, 411, 391, 570; 460/1, 6, 7

[56] References Cited

U.S. PATENT DOCUMENTS

| | | | |
|---|---|---|---|
| 3,329,260 | 7/1967 | Medleycott | 53/385.1 |
| 3,579,998 | 5/1971 | Lerner | 53/385.1 |
| 3,754,370 | 8/1973 | Hanson | 53/570 |
| 3,974,751 | 8/1976 | Carter et al. | 53/391 |
| 4,336,601 | 6/1982 | Onishi | 53/384.1 |
| 4,337,611 | 7/1982 | Mailander et al. | 460/7 |
| 4,790,118 | 12/1988 | Chilcoate | 53/411 |
| 5,064,408 | 11/1991 | Bridgeman | 53/385.1 |
| 5,092,819 | 3/1992 | Schroeder et al. | 460/7 |
| 5,173,079 | 12/1992 | Gerrish | 460/7 |
| 5,327,708 | 7/1994 | Gerrish | 460/7 |
| 5,487,702 | 1/1996 | Campbell et al. | 460/7 |

OTHER PUBLICATIONS

Brochure: "*Tele-Sonic Packaging Corp.*" Norwalk, Ct. 06851—Jan. 1994.
Brochure: "*Sharp One™ Packaging Systems*"; Sharp Packaging Systems, Inc., Sussex, Wisconsin—Jan. 1994.
Brochure: "*E-Z Bagger™ The Economical Answer To Short Run Packaging*", Sharp Packaging, Inc., Sussex, Wisconsin—Jan. 1994.
Brochure: "*Tele-Sonic Free-Flow Bagger Model VHS-26-C*"; Tele-Sonic Packaging Corp. Norwalk, Ct.—Jan. 1994.

*Primary Examiner*—John Sipos
*Assistant Examiner*—Gene L. Kim
*Attorney, Agent, or Firm*—Zarley, McKee, Thomte, Voorhees & Sease

[57] ABSTRACT

The seed packaging machine of this invention is mounted on a conventional plot combine. The harvested seed is blown to a receiving compartment where the seed is weighed and tested for moisture. A bag roll comprising a plurality of bag portions is fed through power rolls to a seed deposit station. A blower blows open the endmost bag and the seed is deposited in the bag portion. A sealing pressure bar is pivoted toward a thermal bar with the top of the bag portion therebetween to seal the bag. The bag is then released to drop into a storage bin. Bar codes are imposed on the bags and are scanned as they approach the deposit station. A computer is connected to all operating components to coordinate the sequential operation thereof. The range and row numbers of the harvested field are imposed on the computer memory, and the computer associates each bag containing harvested seed with the range and row from which the seed was harvested. The bags are perforated to facilitate subsequent drying of the seed. The computer will discard seed that does not meet predetermined weight and moisture parameters so that unwanted seed will not have to be packaged.

25 Claims, 8 Drawing Sheets

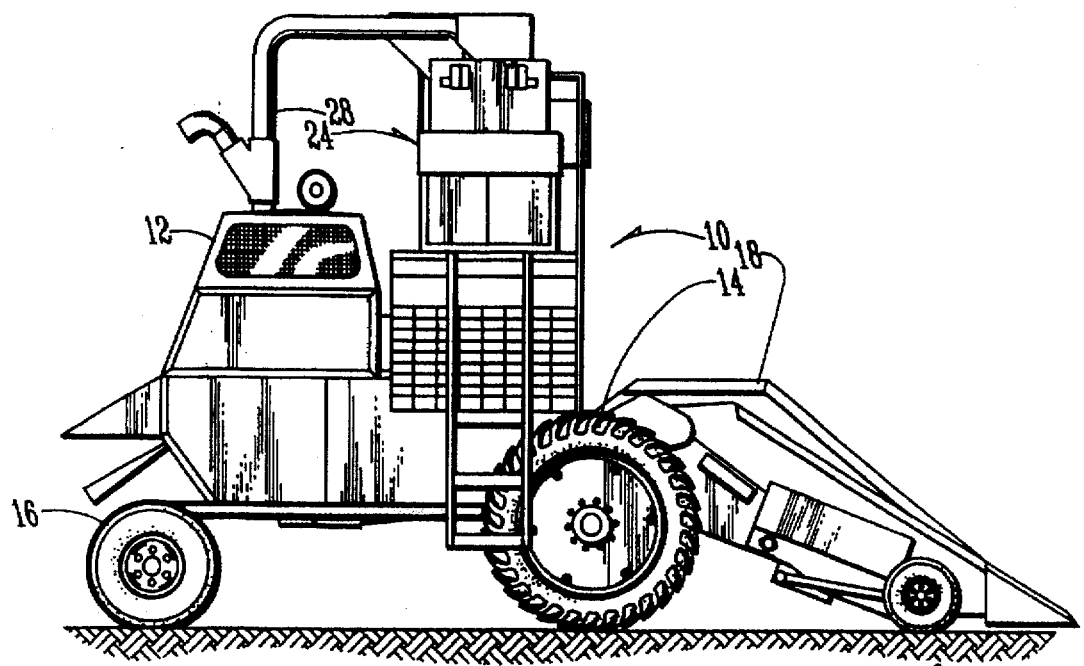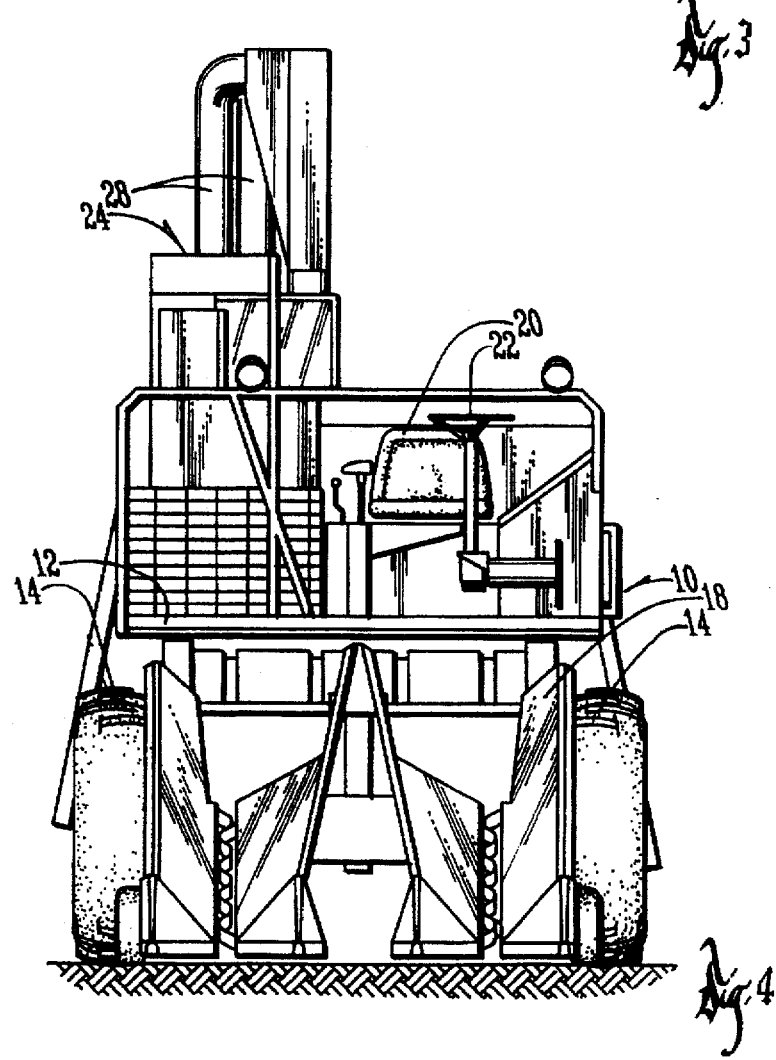

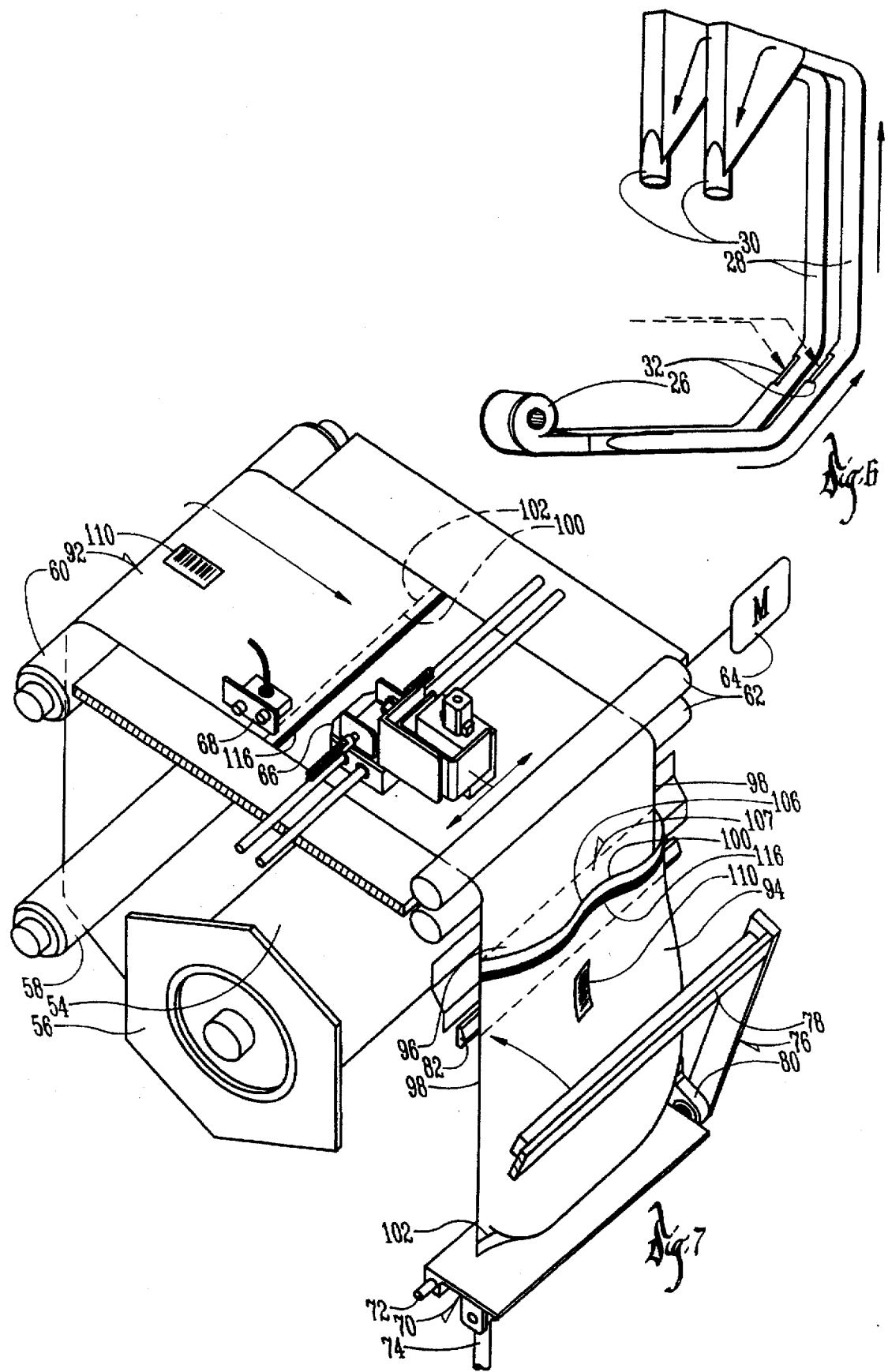

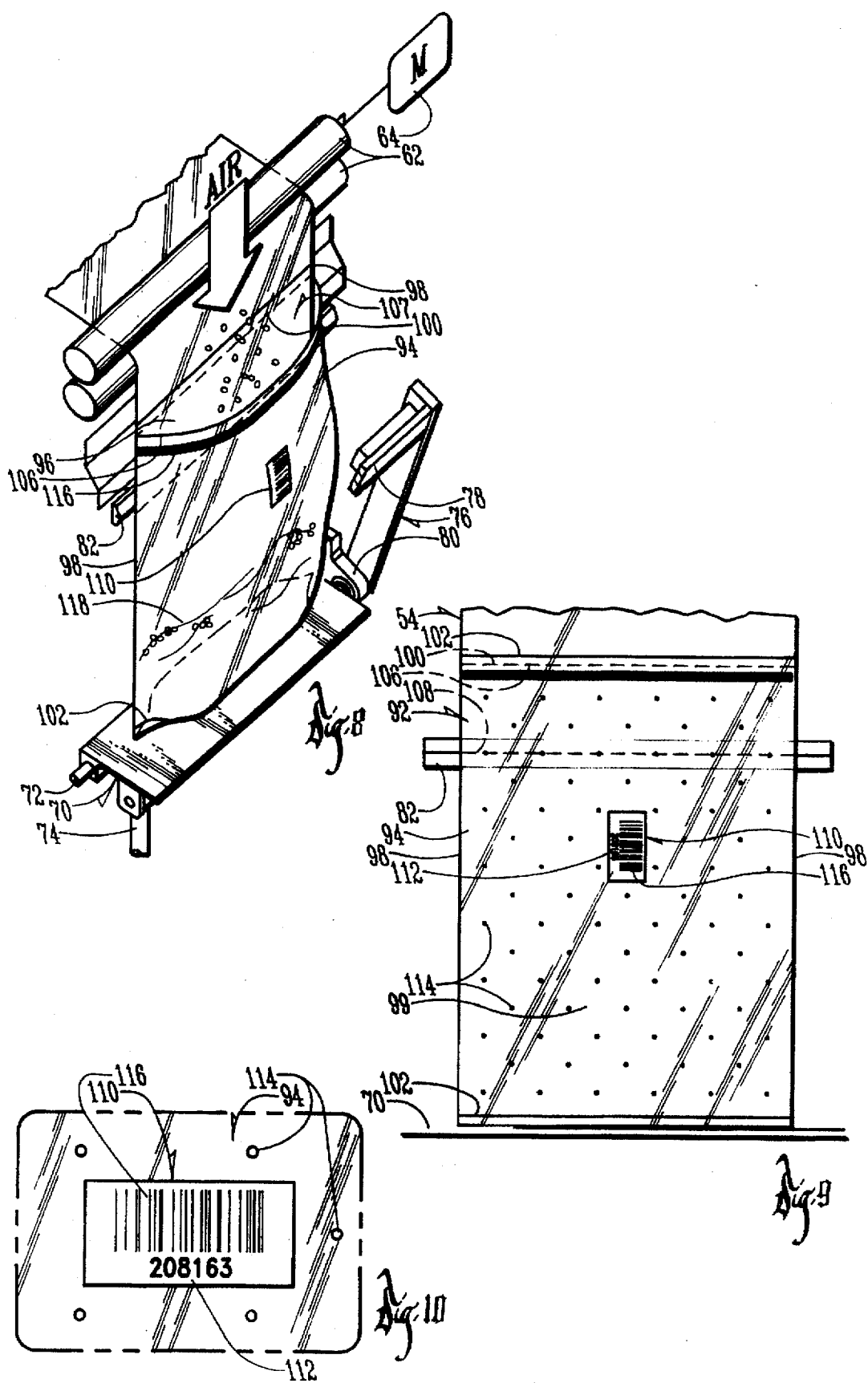

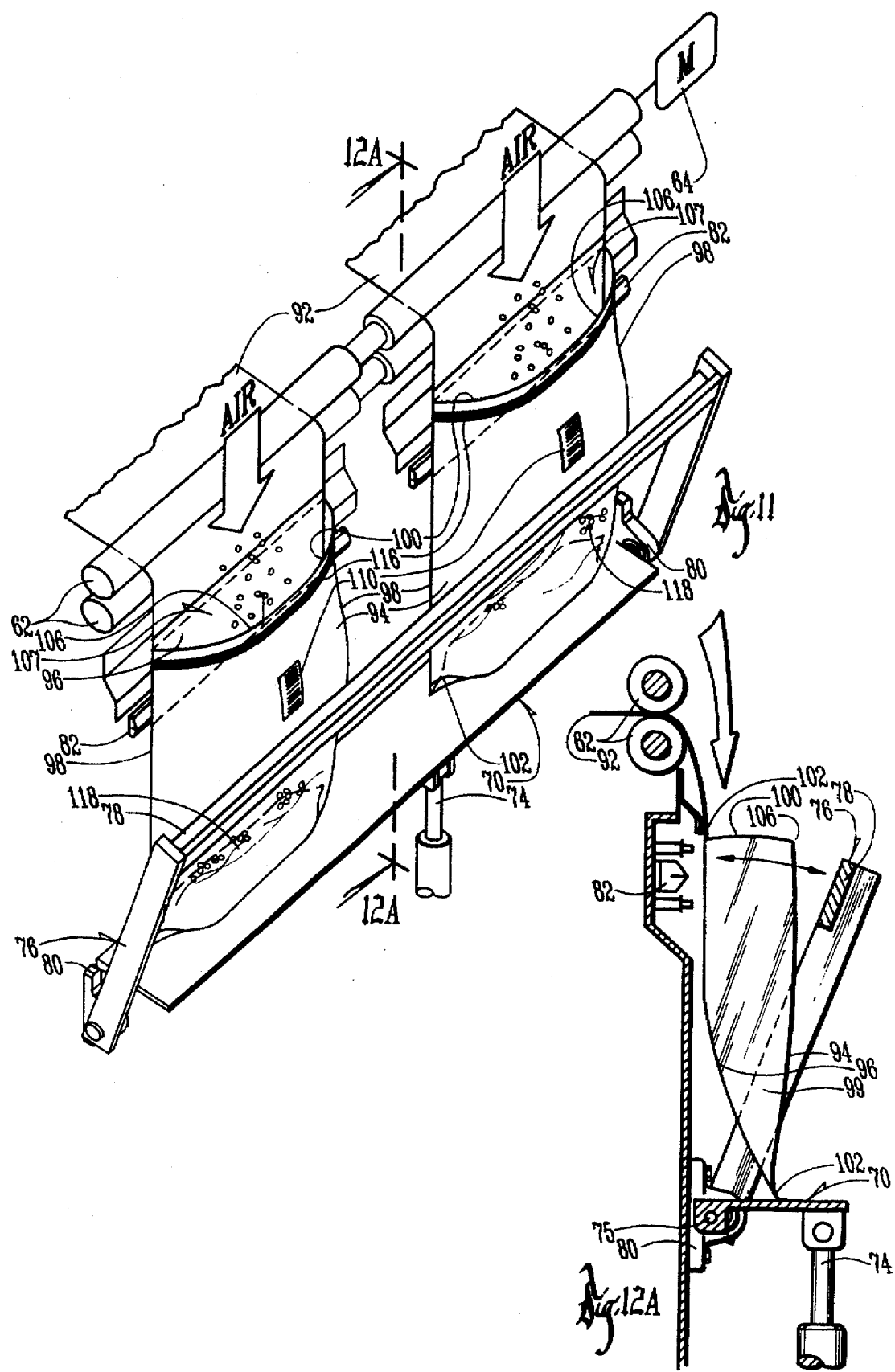

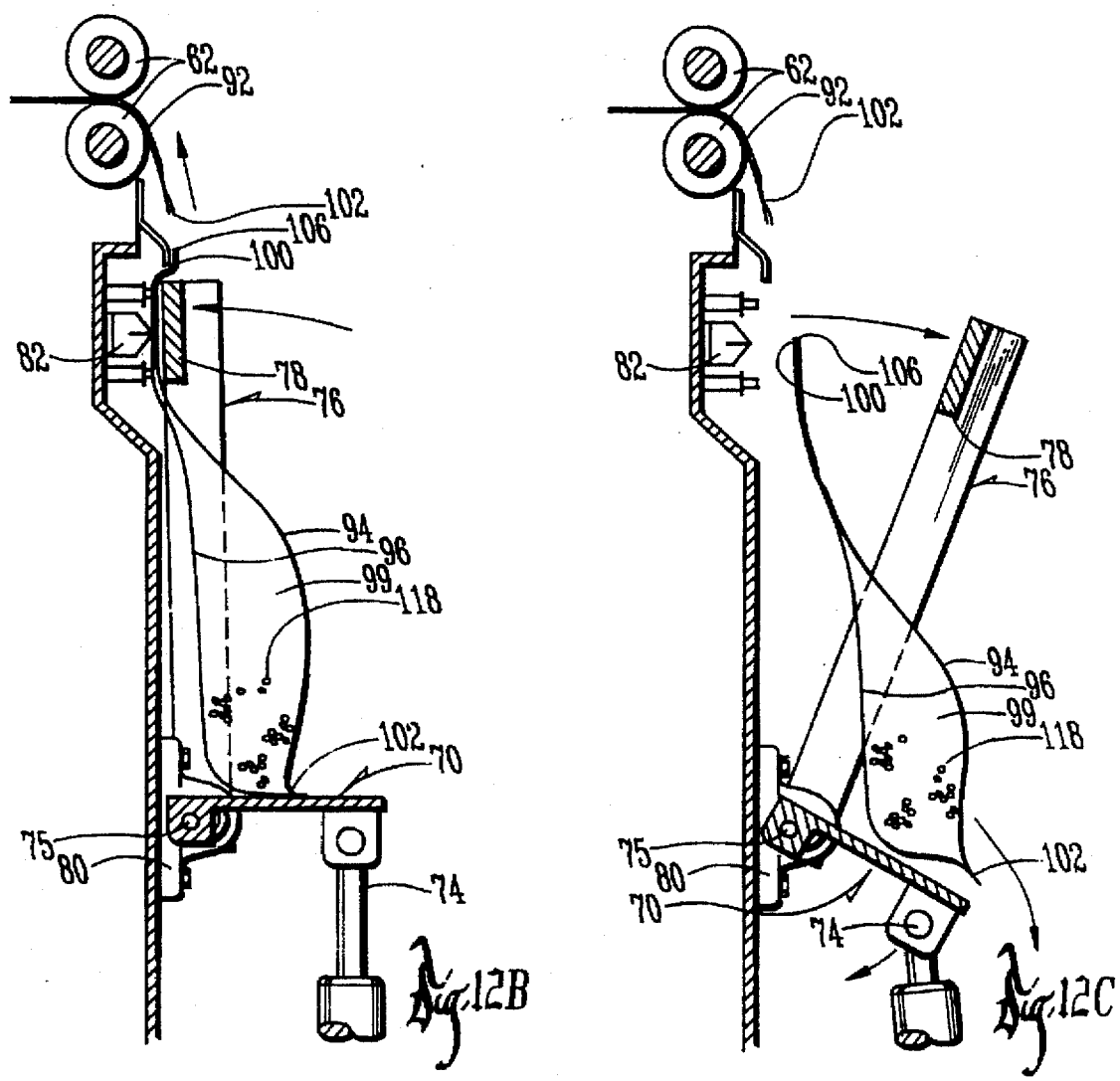

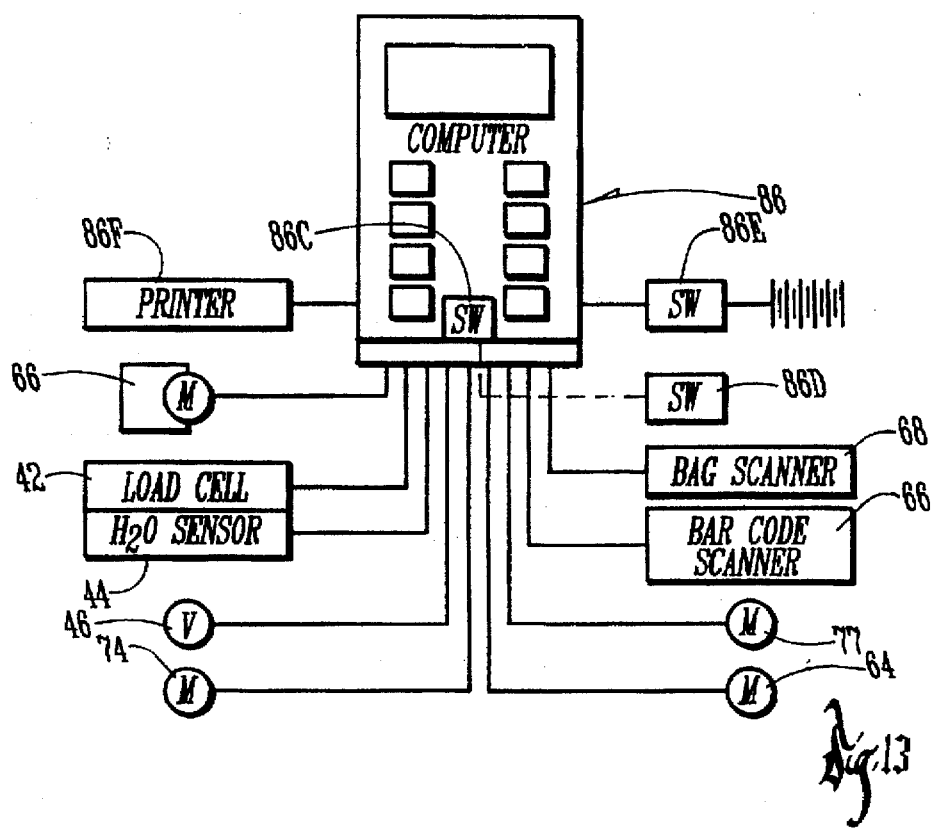
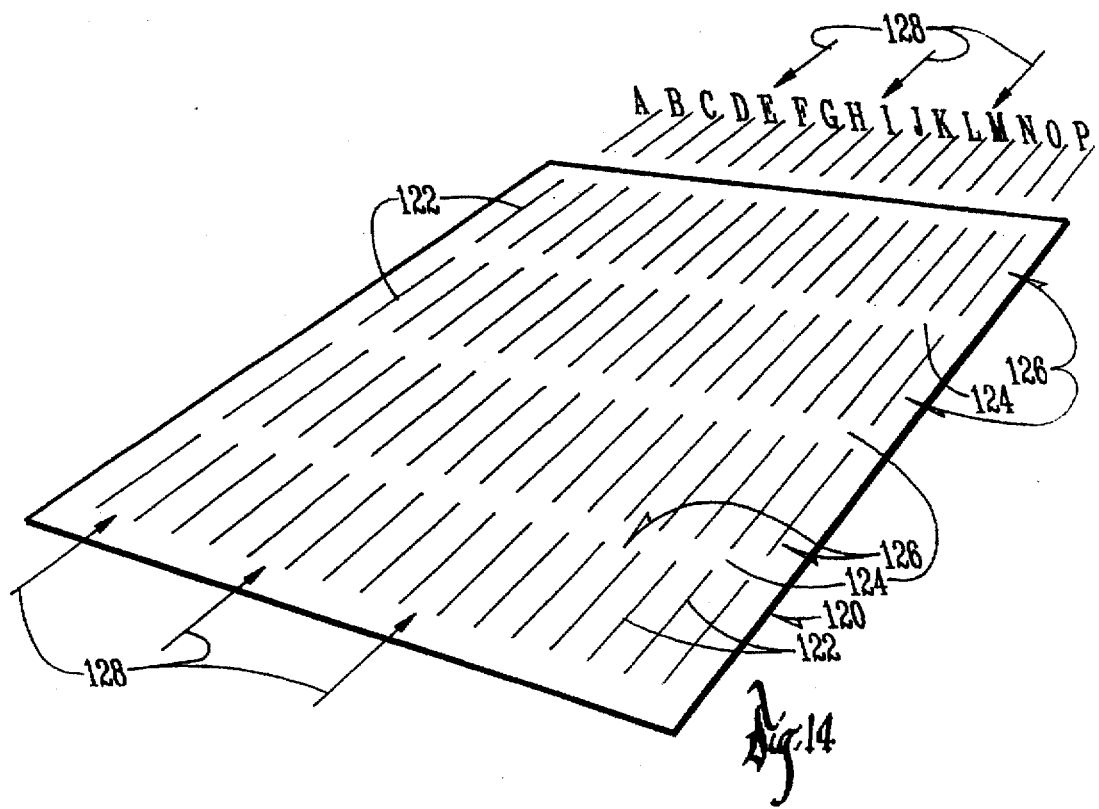

METHOD AND MEANS FOR HARVESTING AND PACKAGING SEEDS

BACKGROUND OF THE INVENTION

In the testing and development of field seeds, it is necessary to harvest seeds of a particular type or variety from a short row, and place the small quantity or batch of harvested seed in a bag for further processing. Rows of different type seeds are planted in parallel fashion. The rows may be from 2–20 feet long and each group of rows is typically separated by an alley wherein a further group or range of rows appears on the other side of the alley with the rows thereof being in alignment with the rows of the first group or range.

The present method for harvesting such test plots involves harvesting the length of the row or rows planted with a conventional plot combine, stopping the combine, collecting the seed harvested in a cloth type bag from a holding hopper in the combine, and then attaching an identification tag to the bag. As much as 80% of the seed so harvested must later be discarded because it may not rise to the standards of the seed being developed. However, the shortcomings of such seed cannot be determined at the time of harvest. Thus, a substantial amount of seed to be discarded goes through the packaging process.

It is therefore a principal object of this invention to automate and accelerate the harvesting and packaging of seed from seed plots.

It is a further object of this invention to be able to select the seed to be packaged after it is harvested and to package the seed to be saved and to discard the seed that does not meet the predetermined parameters of the seed.

A still further object of this invention is to provide a means of identifying each batch of seed packaged and to relate it to the specific row in the field from which the packaged seed was harvested.

It is a further object of this invention to provide a seed packaging device for combines which will permit a batch of seed to be placed in a plastic perforated bag and automatically thermally sealed and deposited in a suitable bin for further processing.

It is a still further object of this invention to provide a packaging device for combines which will permit selected batches of seed to be packaged in bags taken from a continuous roll of bag portions which are sequentially fed to a seed filling station on the combine.

A still further object of this invention is to provide a seed packaging device for combines that will permit the packaged seed to be easily dried to a suitable moisture level by means of perforations in the plastic bags in which the seed is placed.

These and other objects will be apparent to those skilled in the art.

SUMMARY OF THE INVENTION

The seed packaging machine of this invention contains two rolls of bag material which are mounted on spools. The bag rolls are threaded through the machine to the exterior on various idler rollers that keep them in place. A pair of drive rollers embraces each side of the bag roll and are powered by an electric brake motor in both forward and reverse directions. As the bags feed out of the machine, an optical sensor reads a locating mark on the plastic bag and stops the bag in a filling position. When the bag rolls stop, the endmost bag is supported on the bottom by a horizontal load shelf. The load shelf carries the weight of the seed as the bag fills and prevents the bags from tearing off or becoming wrinkled or misformed prior to the sealing operation.

Each bag has a sequential bar code (number) affixed to it. The bar code is read by a scanner which is mounted on a traveling mechanism so that one scanner can read both bar codes on the two bags.

The seed is harvested through conventional plot combine equipment and conveyed to a holding compartment. The seed can be harvested from planter rows 30–40" apart, drilled rows which may be 6" apart, or from broadcast seeding. A conventional load cell and moisture sensor register the weight and moisture content of the batch of grain. If the weight and moisture content is deemed acceptable according to predetermined target parameters, the batch of seed is packaged. If it does not meet those parameters, it is discarded and used for conventional purposes.

There are two blowers mounted on the packaging machine that direct a blast of air at the endmost bag hanging on the exterior of the packaging machine closure. The bag portions on the endmost bag and each of the bags on the roll have an open edge at the top portions thereof, and this blast of air opens the bag and keeps them open while seed is being deposited therein.

A thermal seal bar that has an adjustable sealing temperature is horizontally disposed behind the two endmost bags described heretofore. A moving seal or pressure bar presses the tops of the bags against the thermal seal bar melting or fusing the front and rear panels of the plastic bags together creating a sealed bag. The powered feeding rollers for the bag roll then reverse a short increment tearing the bags loose from the roll along a perforated line adjacent the top of each bag portion. The pressure bar then opens and the load shelf is caused to tip downwardly so that the sealed bag of seed drops to a storage area for further processing. The load shelf then returns to its original position and the cycle is repeated.

A computer forming a part of the packaging machine is operatively connected to all of the functional components and controls the sequence of the process. One or more rows can be harvested at a time.

BRIEF DESCRIPTION OF THE DRAWINGS

FIG. 3 is a side elevational view thereof opposite to that of FIG. 2;

FIG. 4 is front elevational view thereof;

FIG. 6 is a schematic view of the air conveying system for the harvested seed;

FIG. 7 is an enlarged scale perspective view of the bag roll delivery system;

FIG. 8 is a partial view of the lower part of FIG. 7 showing the seed batch being deposited in the bag of FIG. 7;

FIG. 9 is an enlarged scale elevational view of the bag used in the process of this invention;

FIG. 10 is an enlarged scale plan view of the bar code used on each bag;

FIG. 11 is an enlarged scale perspective view of the bag filling station;

FIG. 12A is a sectional view taken on line 12A—12A of FIG. 11;

FIG. 12B is a view similar to that of FIG. 12A except that the seal pressure bar has been moved to an operating position;

FIG. 12C is similar to the view in 12A except the bag has been filled and the seal pressure bar has been returned to its neutral position;

FIG. 13 is a schematic view of the computer circuitry of this invention; and

FIG. 14 is a perspective view of a field having rows of seed crops to be harvested.

DESCRIPTION OF THE PREFERRED EMBODIMENT

Figure 1:
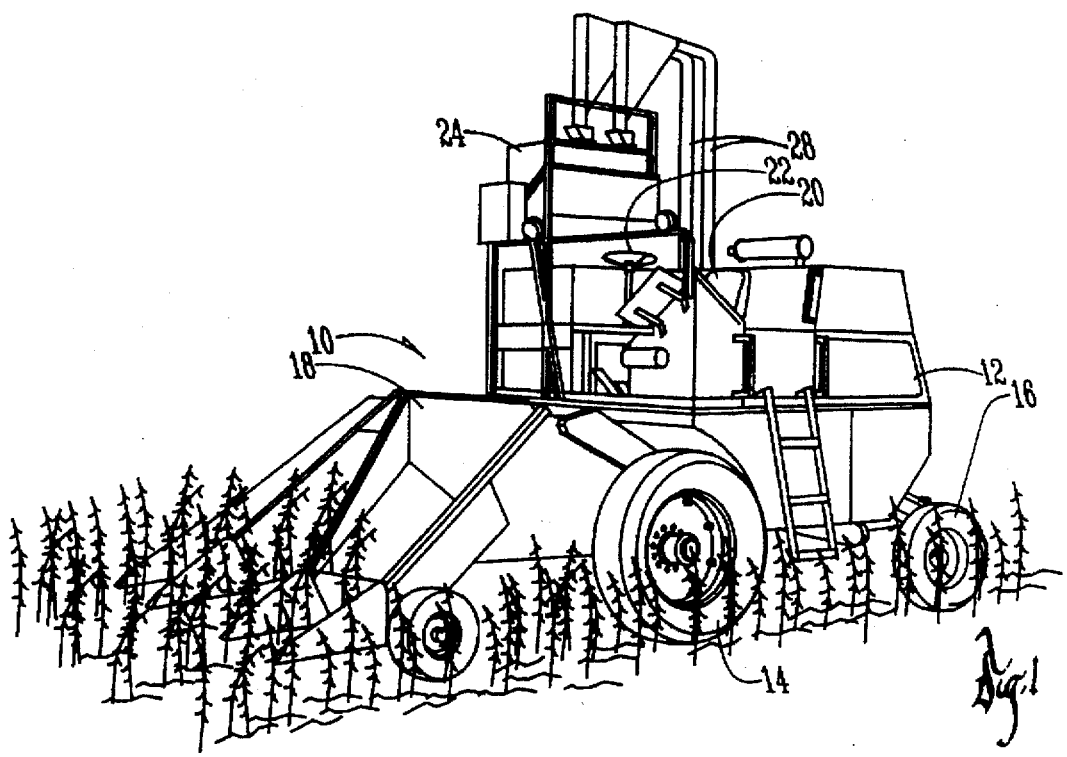
FIG. 1 is a frontal perspective view of the machine of this invention.
Figure 2:
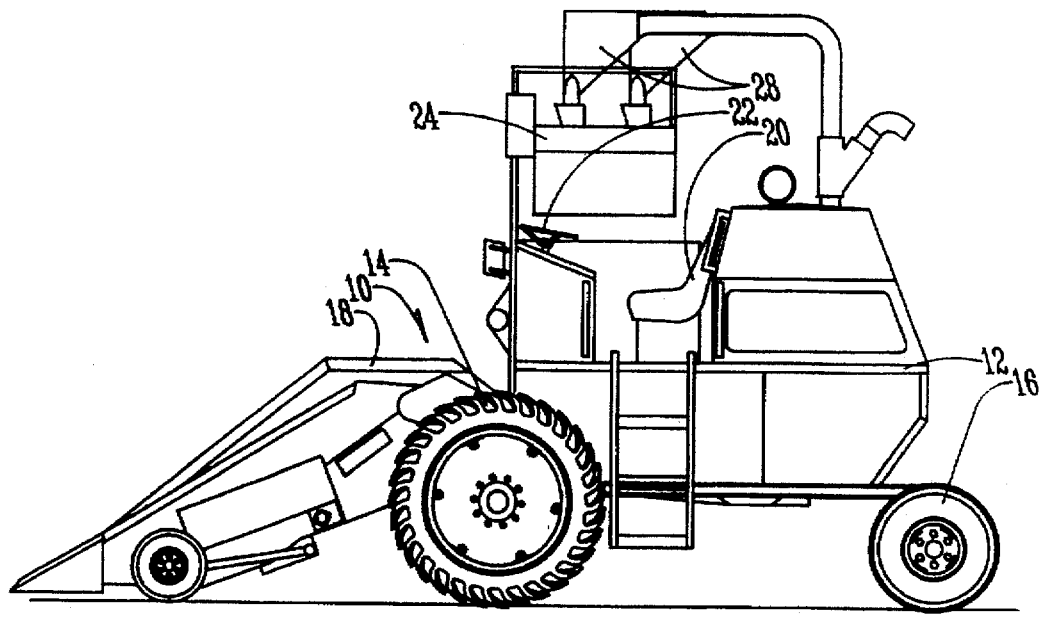
FIG. 2 is a side elevational view thereof.

With reference to FIGS. 1–3, the numeral 10 represents the harvesting and packing machine of this invention. Machine 10 is self-propelled by its own internal combustion engine (not shown). It has a frame or body 12, conventional drive wheels 14, conventional steering wheel 16, a vertically. adjustable two row combine head 18, a dry seat 20, a steering wheel 22, and a packaging machine 24 of this invention.

Within the body 12 are conventional combine elements such as the cylinder and concave, shaker screens and the like, and a grain collection compartment. These features are old in the art and have not been shown in the drawings.

With reference to FIG. 6, a blower operated by an electrical motor (not shown) is connected to two air tubes 28 which have upper exit ends 30 and each tube 28 has a grain inlet opening 30 for receiving harvested grain or seed. The blower 26 is located within the right hand rear portion of body 12. The tubes then extend laterally across the back of body 12 where the inlet openings 32 are located. The tubes then extend upwardly and forwardly towards the discharge or exit ends 30.

Figure 5:
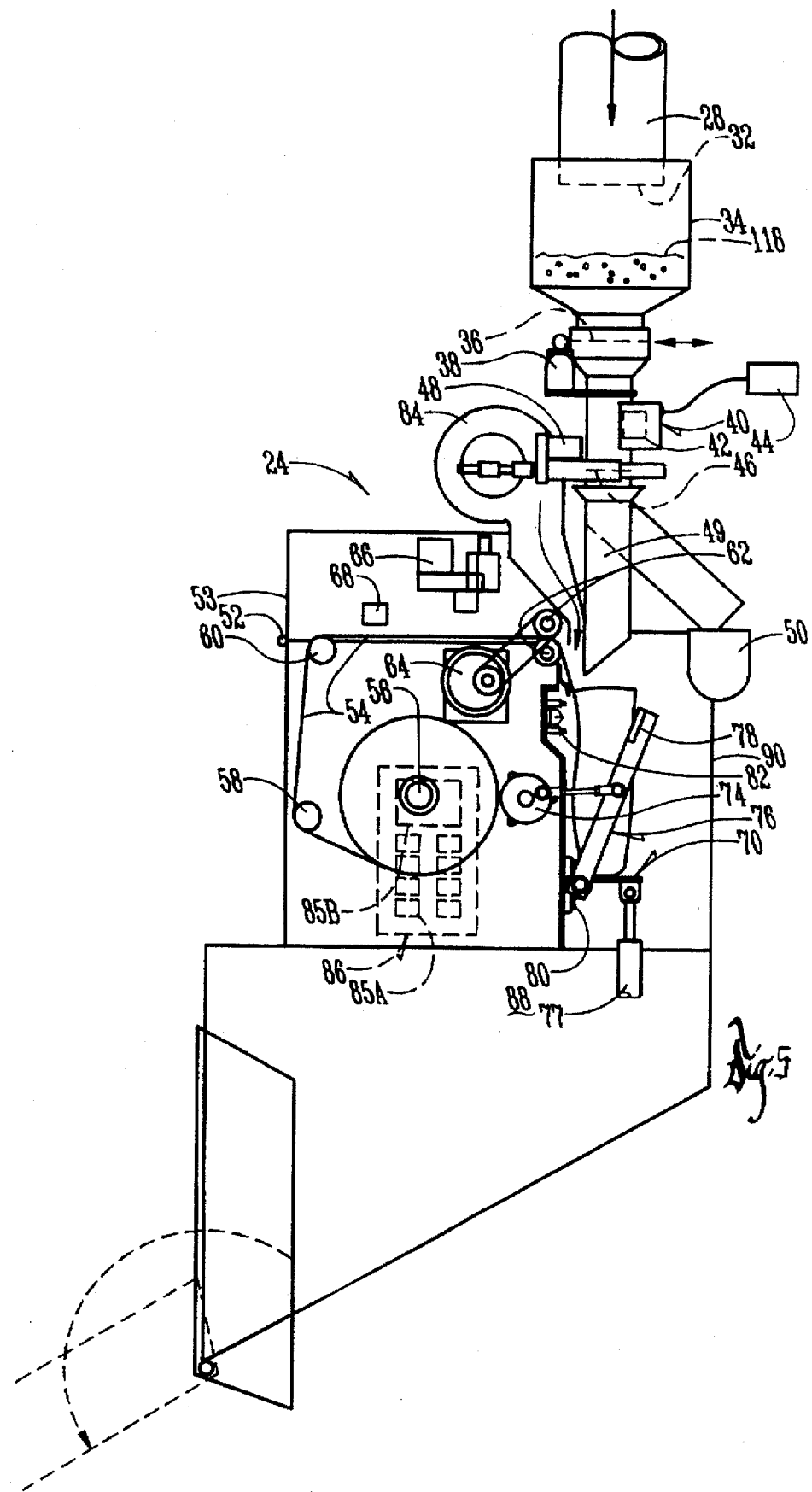
FIG. 5 is an enlarged scale sectional view of the packaging device.

With reference to FIG. 5, two hoppers 34 are located adjacent the exit ends 32 of tubes 28. Each hopper has a slide valve 36 which can be actuated to an open and then a closed position by motor 38. A grain holding compartment 40 is located immediately below the valve 36. A conventional grain scale 42 and a moisture sensor 44 are located within compartment 40 and are adapted to both weigh and to measure the moisture content of grain deposited in the compartment. A conventional grain diverter valve 46 is located at the bottom of compartment 40 and is operated by motor 48. The diverter valve can either allow the grain batch being processed to drop vertically downwardly through the valve, or to be diverted to a seed discard bin 50.

Again, with reference to FIG. 5, a packaging machine housing 52 has a lid 53 pivotally secured thereto. A cylindrical bag roll 54 is rotatably mounted on spool 56. A length of the material of bag roll 54 extends first around idler shaft 58, thence upwardly to and around idler shaft 60, and thence in a horizontal direction extending to and between opposite pressure drive rolls 62. Drive rolls 62 are powered by reversible electric motor 64 and are adapted to unroll the bag roll 54 as will be described hereafter. The motor 64 can operate in reverse as will also be described hereafter.

A moveable scanner 66 is adapted to read the indicia marks on the material of bag 54. When the packaging machine 24 has two separate rolls to accommodate two rows to be harvested, the scanner 66 can be placed on a moveable track so that the scanner can monitor the indicia marks on both bag rolls. A rigid scanner 68 is also mounted over the bag roll to pick up a bar marking on the bag roll material for purposes of controlling the unwinding of bag roll 54 through the machine.

An elongated normally level load shelf 70 is mounted on the housing 52 and is pivotally secured thereto by pivot 72. The load shelf is adapted to be pivoted from a horizontal position to an angular position as best shown in FIG. 12C. The pivoting of load shelf 70 is accomplished by linear actuator 74 which is attached to the underside of shelf 70 by clevice 75. An inverted U-shaped pressure bar 76 is controlled by motor 77 and has an upper horizontal portion 78 is pivotally secured by pivot 80 to the housing 52 and is adapted to move from the angular positions shown in FIGS. 12A and 12C to the vertical position of 12B. When in the vertical position of 12B, it can move upwardly and compress a portion of the bag roll against horizontal thermal bar 82 to effect a seal of a bag portion on the bag roll as will be described hereafter.

A fan 84 is mounted on the lid 53 of housing 52 and is adapted to direct a blast of air downwardly over the exposed end of bag roll 54 to inflate the inmost bag portion thereon as best shown in FIG. 8 and as will be described in more detail hereafter. A hand held computer 85 is mounted on any convenient part of the frame or body 12 (FIGS. 5 and 13). An additional computer 86 (Programmable Logic Controller) is located within housing 52 (FIGS. 5 and 13). Computer 85 has a conventional screen 85A and at least one switch 85B to commence the packaging cycle.

A storage bin 88 is located beneath the housing 52 and serves the function of receiving the package batches of seed. If desired, a plexiglas transparent shield 90 (FIG. 5) can be mounted on the face of housing 52 to protect the operating components from wind.

Bag roll 54 is comprised of a tubular sheet 92 preferably comprised of transparent plastic material. A plastic film having a thickness of 3 mils has one-eighth inch holes of perforations punched therein in a three eight inch grid pattern. The tubular sheet 92 is comprised of a front panel 94, a rear panel 96, which are joined at side edges 98. The sheet has plurality of bag portions 99 formed thereon in end to end relationship. Each bag portion (FIG. 9) has a top 100, and a bottom (seam) 102. A perforated line 104 extends transversely to the longitudinal axis of the bag portion parallel and closely adjacent top 100. A cut line 106 appears on the front panel immediately adjacent the perforated line 104. As will be described hereafter, when the bag is sealed, a seal line 108 is formed across the bag portion 99 in a horizontal direction where the front and rear panels are laminated together. (This takes place after the batch of seed is deposited within the bag portion.)

With reference to FIGS. 9 and 10, a bar code 110 is printed on each bag portion 99. The bar code denotes a series of numbers and the numbers are chronologically arranged on the bag roll 54. In addition, arabic numerals 112 are printed adjacent the bar code 110 and correspond to the numbers of the bar code. The perforations in bag portion 99 are indicated by the numerals 114. An indica bar 116 capable of being scanned by scanner 68 is positioned in a transverse position across the bag and enables the scanner 68 in conjunction with the computer 86 to control the unrolling of bag roll 54 as will be described hereafter. A batch of grain or seed which has been harvested and is to be packaged is designated by the numeral 118. (FIG. 8).

With reference to FIG. 14, a growing field 20 is comprised of a plurality of rows 122 which are designated by the letters A, B, C, D, etc. in FIG. 14. The rows are transversely interrupted by alleys 124 with the rows on each side of each alley representing ranges 126. The arrows 128 designate the routes through the field 120 to be taken by the harvesting machine of this invention.

In operation, the first step is to initialize the computer 86 software so that the program recognizes where the combine 10 is to be moved through the field 120 so that the computer can track its own sequential movement through the field during the harvest operation.

Secondly, the bar code numbers on the bag roll 54 are imposed on the computer software along with the row and range numbers in the field 120 so that the bags can be identified with the row from which the seed is to be harvested. It should be understood that the rows 122 are normally between 2 and 20 feet in length.

It should be understood that the machine of this invention can harvest one or more rows at a time. The machine 10 is designed to harvest simultaneously two rows. With reference to FIG. 14, the machine may be started in the lower left hand corner of FIG. 14 and will simultaneously begin harvesting rows A and C in the first range. Row B typically would not be harvested. However, it would be possible to harvest A and B simultaneously as the machine moves in one direction through the field, and then to harvest rows C and D on the return trip through the field. All of these variations are well within the skill of one in the art.

With the above information imposed on the computer 86, the combine moves forwardly on a pair of rows and the crop harvested is processed conventionally through the combine and the seed from the two rows are separately deposited into the tubes 28 as described herebefore. The operator closes the computer switch 86E to place it in an operating mode. Switch 86E is connected to a conventional source of power. At the end of the row, the machine is stopped and the operator activates switch 86C (or alternatively, foot switch 86D) which causes the packaging machine 24 to cycle. The closing of switch 86C gives the command to the computer and thence to the valve 36 to drop the batch of seed 118 into compartment 40 where the seed is weighed by scale 42 and where the moisture content thereof is measured by sensor 44. If the weight and moisture content of the batch of seed 118 falls within suitable parameters imposed on computer 86, diverter valve 46 drops the grain from compartment 40 downwardly through discharge chute 49 (FIG. 5). If the batch of seed 118 does not fall within the predetermined parameters of weight and moisture content, the batch of grain is diverted into seed discard bin 50 and is not packaged.

Prior to that time, the bag roll 54 through the operation of drive roll 62 has been advanced so that the endmost bag portion 99 has been extended beyond the drive roll 62 with the bottom thereof resting on load shelf 70 (FIG. 7). The computer then turns on fan 84 which blows against the endmost bag portion 99 (FIG. 8) and causes it to open. See opening 107 in FIG. 8. Thus the batch of grain deposited from discharge spout 49 will be directed into the interior of the endmost bag portion 99. (FIG. 8).

When the seed batch 118 has been deposited in the endmost bag 99, the pressure bar 76 is operated by motor 77 to cause the horizontal portion 78 thereof to move upwardly from the position in FIG. 12A to the position of 12B. With the pressure bar 76 in that position, it exerts force against the bag portion 99 against the previously heated thermal bar 82 and causes the front and rear panels of the bag portion 44 to become laminated on seal line 108 (FIG. 9).

The computer 86 then causes the rolls 62 to be operated by motor 64 in a reverse direction for an instant to pull the bag material 54 away from the thermal bar 82. This causes the bag roll to separate on perforated line 104. The pressure bar 76 then moves away from the thermal bar 82 as shown in the change of position thereof from FIG. 12B to FIG. 12C. At the same time, the computer actuates solenoid 74 and causes the load shelf 70 to pivot from a horizontal position of FIG. 12B to the tilted position of FIG. 12C. This allows the sealed and filled bag of seed 99 to drop from a shelf and move into the storage bin 88.

The operator periodically glances at the computer screen 85A to make sure that the bar code numbers on the bag correspond to the correct field and plot location number shown on the screen. The computer software can also alert the machine operator to bar codes that are out of sequence by triggering a light or a buzzer (not shown).

The operator can then cause the computer printer 86F to be actuated by conventional means, so that the readings for the harvested rows can be recorded as to the bag numbers and the row locations.

Thereafter, the computer causes the drive rolls 62 to be reactuated by motor 64 so that a new bag portion 99 is moved into a depository position on load shelf 70.

The foregoing process is then repeated as the machine moves through the field. When the field is completely harvested, the sealed bag portions 99 can be taken to a conventional seed dryer and placed in a warm environment where the seed is quickly dried primarily through forced air which is forced through the perforations 114 which exist in the bags.

It is therefore seen that the method and device of this machine will achieve at least all of their stated objectives.

What is claimed is:

1. A device for harvesting and packaging seeds, comprising, a self-propelled combine having a seed harvesting mechanism capable of harvesting seeds growing on plants in a predetermined segment of a plurality of linear rows, and sequentially conveying said harvested seeds in separate sequential batches for said each predetermined segment of a linear row to an individual batch holding compartment for deposit into a packaging mechanism on said combine, said packaging mechanism including a continuous bag roll separated into a plurality of bags having closed bottoms and openable tops, powered rolls connected to a source of rotational power for sequentially moving said bag roll until one of said bags is moved to a seed filling station, opening means on said packaging mechanism for opening the top of a bag located at said seed filling station for reception of seed, a valve in said holding compartment for discharging an individual batch of seed only from said predetermined segment of a single linear row into a bag located at said seed filling station, a bag closing means on said packaging mechanism for closing a bag located at said seed filling station after seed has been deposited therein, and means on said bagging mechanism for separating a bag located at said seed filling station from said bag roll after such bag has received a deposit of seed.

2. The device of claim 1 wherein said bags are plastic.

3. The device of claim 1 wherein said bags are perforated.

4. The device of claim 1 wherein said bag closing means is a movable pressure bar that is movable against the top of said bag and a heated thermal bar on said packaging machine for laminating the top of said bag to a closed condition.

5. The device of claim 1 wherein each bag in said roll of bags has a bar code therein with an identification indicia thereon different than the indicia on every other bag.

6. The device of claim 5 wherein said bar codes are consecutive numbers.

7. The device of claim 6 wherein said numbers also appear in arabic form adjacent said bar code.

8. The device of claim 5 wherein said packaging mechanism has a scanner to read said bar codes.

9. The device of claim 1 wherein a scale is mounted on said combine to weigh seed deposited in said holding compartment.

10. The device of claim 1 wherein a moisture sensor is mounted in said combine to determine the moisture content of seed deposited in said holding compartment.

11. The device of claim 1 wherein a diverter valve is operatively connected to said holding compartment to permit seed deposited in said holding compartment to be selectively discharged without depositing the same in said packaging mechanism.

12. The device of claim 1 wherein a bag length indica bar is imprinted on each of said bags, a bag scanner on said packaging device to scan said bag length indica bar, said bag scanner being operatively connected to said power rolls to control the sequential moving of said bags to said seed filling station.

13. The device of claim 1 wherein said packaging mechanism has a loading shelf to receive the closed bottom of said bag to support the same while said bag receives a deposit of seed.

14. The device of claim 13 where power means are connected to said support shelf to selectively tip said shelf to discharge said bag therefrom after said bag has been closed and separated from said bag roll.

15. The device of claim 1 wherein said opening means is a fan to blow open said bag along an elongated opening on said bag.

16. The device of claim 1 wherein said means for separating said bag from said roll includes means on said bag closing means for holding said bag against movement, and means to reverse the direction of rotation of said power rolls to tear said bag roll from said bag upstream from said bag closing means.

17. The device of claim 1 wherein the aforesaid components of said packaging mechanism are operatively connected to a computer on said combine to sequentially operate said components to achieve a packaging cycle for each batch of seeds conveyed to said holding compartment.

18. The device of claim 8 wherein the aforesaid components of said packaging mechanism are operatively connected to a computer on said combine to sequentially operate said components to achieve a packaging cycle for each batch of seeds conveyed to said holding compartment.

19. The device of claim 9 wherein the aforesaid components of said packaging mechanism are operatively connected to a computer on said combine to sequentially operate said components to achieve a packaging cycle for each batch of seeds conveyed to said holding compartment.

20. The device of claim 10 wherein the aforesaid components of said packaging mechanism are operatively connected to a computer on said combine to sequentially operate said components to achieve a packaging cycle for each batch of seeds conveyed to said holding compartment.

21. The device of claim 11 wherein the aforesaid components of said packaging mechanism are operatively connected to a computer on said combine to sequentially operate said components to achieve a packaging cycle for each batch of seeds conveyed to said holding compartment.

22. The device of claim 12 wherein the aforesaid components of said packaging mechanism are operatively connected to a computer on said combine to sequentially operate said components to achieve a packaging cycle for each batch of seeds conveyed to said holding compartment.

23. The device of claim 13 wherein the aforesaid components of said packaging mechanism are operatively connected to a computer on said combine to sequentially operate said components to achieve a packaging cycle for each batch of seeds conveyed to said holding compartment.

24. The device of claim 14 wherein the aforesaid components of said packaging mechanism are operatively connected to a computer on said combine to sequentially operate said components to achieve a packaging cycle for each batch of seeds conveyed to said holding compartment.

25. The device of claim 1 wherein said self-propelled combine includes a duplicate set of said foregoing components wherein seed can be harvested from plants in a second predetermined segment of a second linear row and separately segregated and deposited in a bag at a second seed filling station in a bag from a second bag roll.

* * * * *